United States Patent

Loveless

[15] 3,665,813
[45] May 30, 1972

[54] SNAP OPERATOR FOR PRESSURE FLUID VALVE

[72] Inventor: Stanley M. Loveless, Oshtemo, Mich.
[73] Assignee: General Gas Light Company, Kalamazoo, Mich.
[22] Filed: Feb. 24, 1970
[21] Appl. No.: 13,306

[52] U.S. Cl............................................................92/30
[51] Int. Cl..................................F15b 15/26, F15b 21/10
[58] Field of Search.......................92/16, 23, 15, 30; 91/45; 251/75, 63.4, 63.5; 137/625.6, 625.66

[56] References Cited

UNITED STATES PATENTS

| | | | |
|---|---|---|---|
| 1,978,862 | 10/1934 | Gregg | 92/30 X |
| 2,603,191 | 7/1952 | Sterrett | 92/15 X |
| 2,768,610 | 10/1956 | Lieser | 92/16 X |
| 2,853,975 | 9/1958 | Magnus | 92/63 X |
| 2,914,032 | 11/1959 | Powers et al. | 91/45 |
| 2,954,801 | 10/1960 | Nelson | 137/625.66 |
| 3,010,438 | 11/1961 | Fife et al. | 137/625.66 |
| 3,086,745 | 4/1963 | Natho | 251/62 |
| 3,122,065 | 2/1964 | Laun | 251/62 X |

FOREIGN PATENTS OR APPLICATIONS

| | | | |
|---|---|---|---|
| 1,074,362 | 3/1954 | France | 251/63.4 |

*Primary Examiner*—Martin P. Schwadron
*Assistant Examiner*—Irwin C. Cohen
*Attorney*—Woodhams, Blanchard and Flynn

[57] ABSTRACT

An automatically resettable, fluid-actuated, snap-acting operating device for controlling an external device, such as a spool valve assembly, particularly in response to a slow or erratic building pilot pressure. The operating device includes a housing having a chamber in which is slideably positioned a piston having a piston rod extending from the housing for actuating an external device. A detent mechanism is disposed for engagement with the piston rod for normally maintaining the piston in one end position. Pressurized fluid supplied to one end of the chamber causes the detent mechanism to snap out of engagement with the piston rod for permitting the piston and piston rod to move rapidly away from said one end position for causing actuation of the external device. A spring is positioned within the chamber between the piston and the detent mechanism for returning the piston to said one end position and for causing the detent mechanism to automatically re-engage the piston rod after the pressurized fluid has been vented from the chamber.

4 Claims, 2 Drawing Figures

Patented May 30, 1972

3,665,813

INVENTOR
STANLEY M. LOVELESS
BY
Woodhams, Blanchard & Flynn
ATTORNEYS

SNAP OPERATOR FOR PRESSURE FLUID VALVE

FIELD OF THE INVENTION

This invention relates to an operating device and, in particular, relates to a snap-acting, fluid-actuated operator for shifting an external device, such as a spool valve assembly, in response to a slow or erratic building pilot pressure.

BACKGROUND OF THE INVENTION

In spite of the use over many years of fluid pressure control circuits, particularly pneumatic control circuits, there has been a long standing need and demand for control circuit components capable of responding to a slow or erratic building pilot pressure for coacting with and actuating a further circuit component or load member, such as a control valve or an electrical switch. Particularly, when the control components of the prior art are used with slow or erratic building pilot pressures, the shiftable control component and the actuated load member tend to move slowly and/or erratically and often chatter or oscillate with obvious and well recognized undesirable results.

For example, in some use situations, a plant utilizing a pneumatic control circuit will be shut down over night. Accordingly, when the control circuit is again energized the next morning, it often takes a substantial time for the pressure in the control circuit to build up to the desired operating level. In another use situation, a control fluid may be supplied to an actuating device through a metering valve so as to provide a desired time delay. While such a metering device does provide for the necessary time delay, it also results in the pressure of the control fluid building very slowly so that the pressure is not able to rapidly and positively shift or actuate an external load member. Thus, in these use situations, there is a need for a fluid-actuated control device which is responsive to a erratic or slow building pilot pressure while at the same time is able to positively and rapidly shift or actuate the external load member.

In providing means to solve this problem, it must be borne in mind that the control circuit component must be capable of fluid actuation while at the same time the component must be of extremely small size and capable of efficient operation. Further, the component must be capable of substantially automatic operation in response to fluid pressure actuation and control.

While numerous control circuit components for purposes above indicated have been suggested, most of these components have proven undesirable due to their excessive size and mechanical complexity. These undesirable limitations result in the overall control circuit occupying more space and requiring more maintenance than is tolerable in many cases where such equipment would other wise be applicable, and also results in the individual components being of excessive cost.

Further, some of the known control devices have attempted to solve the above problem by providing an operating device which utilizes a release mechanism for permitting rapid actuation of an external load member when the slow building pilot pressure reaches a predetermined minimum. However, in many of these devices the rapid release of the actuating device results in a sudden increase in the volume of the pilot fluid and a corresponding rapid decrease in the pressure of the pilot fluid, whereupon a restoring spring immediately causes the device to reset to its original position. This resetting of the device causes the pilot fluid to again be compressed to its original pressure level, whereupon the actuating device thus oscillates back and forth, which in turn causes a corresponding oscillation of the external load member.

Accordingly, it is an object of the present invention to provide an improved fluid-actuated operating device which has an actuating member capable of positively and rapidly shifting, particularly in response to a slow or erratic building pilot pressure signal, for controlling an external device, such as a spool valve assembly.

A further object of the present invention is to provide a fluid-actuated operator which has a mechanically movable device whose movement can by any convenient means be translated into an output signal.

A still further object of the present invention is to provide a fluid-actuated operator, as aforesaid, particularly an operator adapted to be pneumatically activated and designed for operation of a spool valve assembly.

Still a further object of the present invention is to provide an operator, as aforesaid, which includes a piston structure which is displaced by a pressurized pilot fluid for causing actuation of an external device, the piston structure coacting with a detent mechanism for permitting movement of the piston structure and actuation of the external device by means of a snap-like action.

Another object of the present invention is to provide an improved fluid-actuated operator, as aforesaid, which substantially eliminates flutter of the piston structure due to variations in the pressure of the pilot fluid so that the piston and detent mechanism are actuated both rapidly and positively.

Still another object of the present invention is to provide an improved fluid-actuated operator, as aforesaid, which requires an actuation force of a predetermined minimum value for releasing the detent mechanism and actuating the piston.

A further object of the present invention is to provide an improved fluid-actuated operator, as aforesaid, wherein the piston is maintained in the actuated position by a holding force which is substantially less than the actuating force whereby unstable oscillation of the piston between the set and actuated positions is prevented.

Another object of the present invention is to provide an improved fluid-actuated operator, as aforesaid, having spring means disposed between the piston and the detent mechanism whereby release of the detent mechanism and corresponding shifting of the piston causes both ends of the spring means to be compressed, thereby developing a restoring force for permitting both the detent mechanism and the piston to be rapidly reshifted and reset to their original positions when the pilot fluid is relieved.

Still another object of the present invention is to provide an improved fluid-actuated operator, as aforesaid, wherein the restoring force developed by the spring means is substantially less than the actuating force to prevent the piston from being rapidly oscillated back and forth due to the volumetric expansion and pressure decrease of the pilot fluid when the piston is shifted to the actuated position.

A further object of the present invention is to provide an improved fluid-actuated operator, as aforesaid, which is small, compact, relatively inexpensive to manufacture, efficient in operation, relatively free of maintenance, and adaptable to be connected to or mounted on a plurality of different external devices or valve assemblies for actuation thereof.

Other objects and purposes of the invention will be apparent to persons acquainted with devices of this type upon reading the following specification and inspecting the accompanying drawings.

Figure 1:
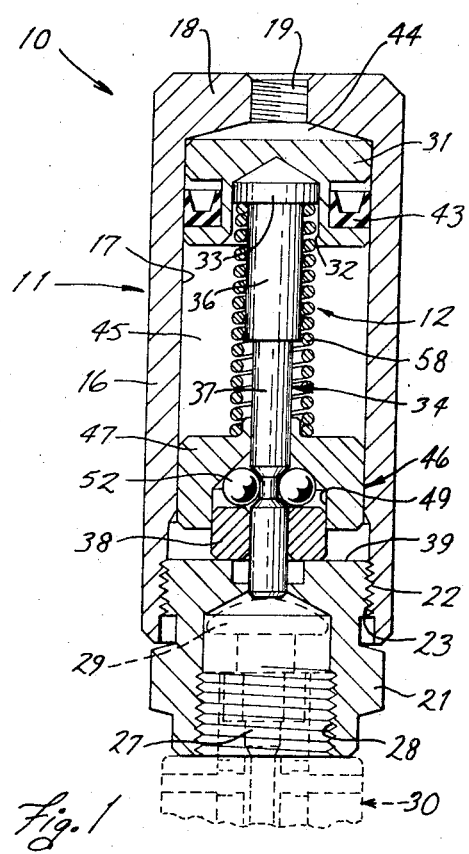
FIG. 1 is a cross-sectional view of an operator constructed according to the present invention, the operator being illustrated in its normal or retracted position.

Certain terminology will be used in the following description for convenience and reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

SUMMARY OF THE INVENTION

The objects and purposes of the present invention are met by providing a substantially closed housing having an actuator mechanism slideably received therein, which actuator mechanism includes a piston which divides the interior of the housing into first and second chambers. The housing is provided with a port communicating with one of the chambers for permitting pressurized pilot fluid to be supplied thereto. A spring is disposed in the other chamber and coacts between the piston and a detent mechanism, which detent mechanism normally maintains the piston in one end position. The detent mechanism includes a detent member, such as a ball, for engagement within a groove formed in the piston rod, the detent member being confined by a detent sleeve which surrounds the detent member and is slideably received within the other chamber. The detent sleeve is provided with a tapered cam surface thereon in bearing engagement with the detent member. When the pressure of the pilot fluid in the first chamber increases to a first predetermined minimum pressure, the pilot fluid imposes a predetermined minimum actuating force on the piston. The actuating force thus causes the piston and piston rod to overcome the combined resisting force imposed thereon by the spring and the detent mechanism, whereupon the detent member is displaced radially outwardly for permitting the piston and piston rod to rapidly move toward the opposite end position for actuating an external device such as the actuator button of a valve spool, a switch or other desired load. The outward camming of the detent member causes the detent sleeve to be cammed toward the piston, whereby the spring positioned therebetween is compressed by movement of both the piston and detent sleeve, thereby developing a restoring force for permitting rapid return of the piston to its one end position and rapid restoring of the detent mechanism to its normal position when the pressure of the pilot fluid is decreased below a second predetermined minimum. The restoring force and the second minimum pressure are both substantially less than the actuating force and the first minimum pressure, respectively.

DETAILED DESCRIPTION

Figure 2:
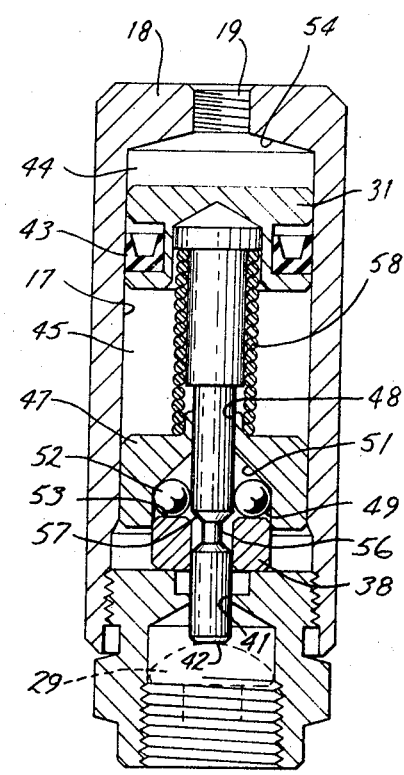
FIG. 2 is a cross-sectional view similar to FIG. 1 and illustrating the operator in its extended or actuated position.

FIGS. 1 and 2 illustrate therein a fluid-actuated, snap-acting operator 10 constructed according to the present invention. The operator 10 includes a housing 11 in which is positioned a slideable actuator mechanism 12.

The housing 11 specifically includes a cylindrical sleeve 16 which defines therein a cylindrical bore 17. The one end of the bore 17 is substantially closed by means of an end wall 18 which is fixedly, here integrally, connected to the sleeve 16. The end wall 18 is provided with a pilot port or opening 19 extending therethrough, which pilot port is adapted to receive therein a suitable conduit for supplying a pressurized pilot fluid to the operator 10.

The other end of the sleeve 16 is substantially closed by means of a suitable cap or adaptor 21. The cap 21 has external threads 22 thereon which are disposed in engagement with further internal threads 23 provided adjacent the end of the sleeve 16. The outer end of the cap 21 is provided with an enlarged bore 27, the outer end portion 28 of which is in this embodiment threaded for permitting the operator 10 to be suitably threadably connected to an external device 30, such as one of the spool valve assemblies disclosed in my copending U.S. application Ser. No. 13,325, which valve assembly 30 has an actuator button 29 secured to the end of the valve spool plunger and is adapted to be disposed within the bore 27 as illustrated in dotted lines in FIG. 1 for actuation thereof by the actuator mechanism 12.

The actuator mechanism 12 includes a piston 31 slideably received within the bore 17, the piston having an enlarged central bore 32 in which is snugly received the enlarged cylindrical portion 33 of the actuator or piston rod 34. The piston rod 34 has an intermediate cylindrical portion 36 which is of smaller diameter than the enlarged cylindrical portion 33 and is fixedly, here integrally, connected thereto. The intermediate cylindrical portion 36 is also fixedly, here integrally, connected to a reduced diameter end portion 37. The end portion 37 is slideably received within and extends through a bearing sleeve 38, which sleeve abuts against the inner axial end face 39 of the cap 21.

The free end of the piston rod 34, particularly the lower end of the rod portion 37, is adapted to extend into and through a central opening 41 provided in the end cap 21, which opening 41 communicates with and is substantially coaxially aligned with the bore 27. The end face 42 of the piston rod 34 is thus disposed for coaction with the actuator button 29.

As illustrated in FIG. 2, the piston 31 divides the interior of the housing 11 into two chambers 44 and 45. The piston 31 is provided with a channel-shaped annular resilient seal ring 43 surrounding same, which seal ring 43 is disposed for sliding and sealing engagement with the internal wall defining the bore 17 so as to substantially prevent fluid communication between the chambers 44 and 45. The chamber 44 is in part defined by the interior conical surface 54 formed on the end wall 18 for permitting pressurized fluid supplied through the port 19 to act against the end face of the piston 31.

The piston 31 is normally maintained in the retracted position illustrated in FIG. 1 by means of a detent mechanism 46, which detent mechanism permits the actuator mechanism 12 to have a snap-like action when moving between the retracted and actuated positions illustrated in FIGS. 1 and 2, respectively.

The detent mechanism 46 specifically includes a detent sleeve 47 disposed within the chamber 45 and slideably supported by the cylindrical sleeve portion 16. The detent sleeve 47 includes an opening extending coaxially therethrough, which opening includes a first cylindrical opening portion 48 disposed in surrounding relationship to the piston rod 34 for slideably supporting and receiving same. The opening portion 48 communicates with a further enlarged opening portion 49, being interconnected thereto by means of an intermediate conical or tapered wall 51. The enlarged opening portion 49 has a diameter substantially equal to or slightly larger than the diameter of the bearing sleeve 38 for permitting the bearing sleeve 38 to slideably extend into the opening portion 49 during operation.

The detent mechanism 46 includes one or more detent members, such as balls 52, disposed within the detent sleeve 47, the balls 52 being disposed in surrounding relationship to the piston rod 34. The balls 52 are confined within the detent sleeve between the conical wall 51 and the opposite end wall 53 fo the bearing sleeve 38.

The detent balls 52 are adapted for coaction with the piston rod 34 for normally maintaining the piston assembly in its retracted position as illustrated in FIG. 1. For this purpose, the piston rod 34 is provided with an annular recess or groove 56 therein, the axial ends of the groove being defined by conical wall portions 57. The balls 52 are normally maintained in engagement with the groove 56 as illustrated in FIG. 1 by means of a compression spring 58, which spring 58 surrounds the piston rod 34 and has its opposite ends resiliently acting against the cylindrical portion 33 and the detent sleeve 47.

OPERATION

The operation of the device embodying the invention will be described in detail hereinbelow for a better understanding thereof.

Assuming that the operator 10 is connected to an external device, such as one of the spool valve assemblies illustrated in my copending U.S. application Ser. No. 13,325, then actuation of the operator 10 will cause a corresponding actuation of the spool valve assembly due to the operator 10 causing a shifting of the actuator button 29.

The operator 10 is normally maintained in its retracted position illustrated in FIG. 1, in which position the piston 31 is maintained in one end position due to the urging of the spring 58. The spring 58 also causes the detent sleeve 47 to be urged axially away from the piston 31 whereby the conical surface 51 contacts the balls 52 and cams same inwardly into the annular groove 56, the groove 56 being disposed directly above the bearing sleeve 38 when the piston 31 is in its upper end position. The detent mechanism 46 thus resiliently maintains the piston 31 and piston rod 34 in the retracted position (FIG. 1) and thus prevents flutter of the piston rod due to the imposition of external forces on the operator 10.

When a pilot pressure fluid, preferably pressurized air, is supplied through port 19 to the chamber 44, the pressurized air acts on the piston 31 and applies a pressure force thereto which tends to move the piston axially (downwardly in FIG. 1) away from its normal end position. However, the tendency for the piston to move is resisted by the detent mechanism 46 and the spring 58 so long as the pressure of the pilot fluid and the resulting pressure force remains below a first predetermined minimum. However, when the pilot fluid supplied to chamber 44 exceeds the first predetermined minimum pressure, then it overcomes the combined resisting force of the spring 58 and detent mechanism 46, whereupon the resistance of the detent mechanism breaks down and the piston and piston rod are rapidly shifted with a snap-like action from the retracted position of FIG. 1 to the extended or actuated position of FIG. 2.

More particularly, when the pilot fluid exceeds the first predetermined minimum pressure, the actuating pressure force imposed on the piston 31 tends to move piston 31 and piston rod 34 away from the normal end position (downwardly in FIG. 1), which in turn causes the upper conical sidewall 57 of the groove 56 to cam the detent balls 52 radially outwardly. However, since the detent balls are normally maintained in engagement with the conical wall 51, the outward camming of the detent balls 52 causes an axial camming (upwardly in FIG. 1) of the detent sleeve 47 toward the piston 31. This tendency of sleeve 47 to move toward piston 31 is resisted by the spring 58. Proper choice of said spring will thus determine the pressure at which the actuator will move. When the balls finally move out of the groove 56 and into the enlarged opening portion 49 substantially as illustrated in FIG. 2, the resistance against downward movement of the rod 34 collapses and said rod moves downwardly very quickly, thus providing the desired quick and positive action. The needed force for this purpose can be obtained by properly selecting the area of piston 31 in view of the magnitude of the pilot pressure.

The operator 10 will be maintained in its actuated or extended position illustrated in FIG. 2 so long as the pilot pressure within chamber 44 is equal to or greater than a second predetermined minimum, which second predetermined minimum represents a holding pressure level sufficient to create a holding force on the piston 31 equal to or greater than the restoring force of spring 58. The holding pressure (that is, the second minimum pressure) is generally substantially less than the actuating pressure (that is, the first minimum pressure) since movement of the piston 31 from the set position of FIG. 1 to the actuated position of FIG. 2 results in a substantial increase in the volume of the chamber 44, which in turn results in a substantial volumetric increase of the pilot fluid contained within chamber 44 and a corresponding pressure decrease of the pilot fluid. The pilot fluid holding pressure is generally between about 15 percent and 30 percent of the pilot fluid actuating pressure. Accordingly, the restoring force developed by the spring 58 in the compressed condition illustrated in FIG. 2 must be at least slightly less than the minimum holding force developed by the pilot pressure. Thus, the restoring force of spring 58 is, in the preferred embodiment of the invention, approximately no more than 15 percent of the actuating force. The low restoring force as developed by spring 58 thus prevents back and forth oscillation of the piston 31 due to the volumetric expansion and corresponding pressure drop which occurs in the pilot fluid due to the expansion of chamber 44 as piston 31 is moved from the set to the actuated position.

When the pilot fluid in chamber 44 is relieved or falls below the holding pressure level, then the spring 58 rapidly returns the operator to its initial position illustrated in FIG. 1 due to spring 58 causing piston 31 to return to its upper end position, whereupon groove 56 is thus withdrawn from bearing sleeve 38, thereby enabling spring 58 to move detent sleeve 47 downwardly whereby cam surface 51 cams the detent balls 52 back into the annular groove 56.

It should be noted that when the operator 10 is moved to the actuated position illustrated in FIG. 2, the piston 31 is moved axially away from its end position, thereby causing compression of the upper end of the spring 58. Simultaneously with the above movement, the detent sleeve 47 is moved upwardly relative to the housing in a direction toward the piston 31, thereby also causing simultaneous compression of the lower end of the spring 58. Thus, since both the piston and the detent sleeve each move relative to the housing and additionally move toward one another, the spring 58 undergoes a rapid compression since the displacement or deflection of the spring exceeds the displacement of the piston, and thus the spring 58, depending upon its spring rate, is able to rapidly develop a relatively large restoring force which permits the actuating mechanism 12 to be rapidly returned to its initial position when the pilot fluid within chamber 44 is relieved.

Although the rod 34 is herein shown as mechanically operating another valve, it will be appreciated that is can also operate any desired kind of load, such as an electrical switch or a directly connected mechanical movement.

Although a particular preferred embodiment of the invention has been disclosed above for illustrative purposes, it will be understood that obvious or equivalent variations or modifications of the disclosed apparatus, including the rearrangement of parts, lie within the scope of the present invention.

I claim:

1. A fluid-actuated, snap-acting operator, particularly for a valve, comprising:

housing means defining a bore therein;

actuator means positioned within said bore for movement between first and second positions for actuating a selected member, such as a valve spool;

said actuator means including piston means positioned within said bore in slidable sealing engagement with said housing means for movement between said first and second positions, said piston means dividing said bore into first and second chambers;

said actuator means also including a portion fixedly connected to said piston means and disposed within said second chamber, said portion including recess means therein;

inlet passage means in communication with said first chamber for supplying pressure fluid to said first chamber for causing movement of said piston means from said first position to said second position;

control means coacting with said actuator means for releasably maintaining said actuator means in said first position while permitting release of said actuator means and movement thereof to said second position when the pressure of the fluid in said first chamber exceeds a first predetermined magnitude, said control means coacting with said actuator means when in said second position for causing return of said actuator means to said first position when the pressure of the fluid in said first chamber is less than a second predetermined magnitude, said second predetermined magnitude being substantially smaller than said first predetermined magnitude;

said control means including detent means coacting with said actuator means for normally releasably maintaining same in said first position, said detent means including a movable detent ball normally disposed in engagement with the recess means of said portion of said actuator means and movable relative thereto, and a detent sleeve member movably disposed within said second chamber in surrounding relationship to said portion of said actuator means and positioned for coaction with said detent ball for controlling the movement thereof relative to said actuator means;

said detent sleeve having first wall means defining a conical opening therein and second wall means defining a substantially cylindrical opening in continuous relationship with said conical opening at the large diameter end thereof, said detent ball being disposed within and movable between said conical opening and said cylindrical opening, said ball being adapted to be at least partially disposed within said recess means when said ball is disposed within said conical opening;

bearing means stationarily positioned relative to said housing means and having a portion thereof slidably received within said cylindrical opening, said bearing means having a surface in bearing engagement with said detent ball for maintaining said ball within said detent sleeve; and said control means further including resilient means coacting with said detent means for normally resiliently maintaining said detent ball in engagement with said recess means so long as said actuator means is in said first position and the pressure of the fluid within said first chamber does not exceed said first predetermined magnitude, said resilient means having a first portion thereof resiliently urging said actuator means in one direction and a second portion thereof coacting with said detent sleeve for resiliently urging same in the opposite direction, whereby said resilient means causes said actuator means to be returned from said second position to said first position and causes said detent means to again engage said actuator means when same returns to said first position whenever the pressure of the fluid in said first chamber is less than said second predetermined magnitude.

2. An operator according to claim 1, wherein said resilient means comprises a spring member disposed within said second chamber, said first portion comprising one end of said spring member with said one end being disposed in engagement with said actuator means, and said second portion comprising the other end of said spring member with said other end being disposed in engagement with said detent sleeve, whereby said spring member resiliently urges said actuator means and said detent sleeve away from one another.

3. An operator according to claim 2, wherein said portion of said actuator means comprises an elongated rod disposed within said second chamber and extending through said detent sleeve, said rod having said recess means formed therein whereby said detent ball coacts between said rod and said detent sleeve, the end of said rod remote from said piston means being slidably guided by said bearing means.

4. A fluid-actuated, snap-acting operator, particularly for a valve, comprising:

housing means defining a bore therein;

actuator means positioned within said bore for movement between first and second positions for actuating a selected member, such as a valve spool;

said actuator means including piston means positioned within said bore in slidable sealing engagement with said housing means for movement between said first and second positions, said piston means dividing said bore into first and second chambers;

said actuator means also including an elongated rod extending longitudinally of said second chamber with one end of said rod being in engagement with said piston means, the other end of said rod being adapted for engaging and actuating said selected member;

inlet passage means in communication with said first chamber for permitting pressure fluid to be supplied to said first chamber for causing movement of said piston means from said first position to said second position when the pressure of the fluid within the first chamber is at least equal to a predetermined minimum pressure;

detent means coacting with said actuator means for maintaining said piston means in said first position, said detent means including a plurality of detent balls and a detent sleeve slidably disposed within said housing means in surrounding relationship to said rod, said rod having recess means therein for permitting reception of said detent balls, said detent means further including cam means on said detent sleeve coacting with said detent balls for permitting same to be cammed into and out of said recess means as said piston means and said rod are moved between said first and second positions;

spring means disposed in said second chamber and resiliently coacting between said piston means and said detent sleeve for normally maintaining said piston means in said first position and for normally maintaining said detent balls disposed within said recess means so long as the pressure of the fluid within the first chamber is less than said predetermined minimum pressure;

said spring means including a coil spring disposed within said second chamber, said coil spring having one end thereof in engagement with said piston means and the other end thereof in engagement with said detent sleeve for resiliently urging said piston means and said detent sleeve in opposite directions, whereby movement of said piston means from said first to said second position causes said detent balls to be cammed out of engagement with said recess means whereby said detent sleeve is likewise slidably moved relative to said housing means so that said piston means and said detent sleeve are each slidably moved relative to said housing means in a direction toward one another whereby the deflection of said coil spring substantially exceeds the displacement of said piston means;

said detent sleeve having first wall means defining a conical opening therein and second wall means defining a substantially cylindrical opening in continuous relationship with said conical opening at the large diameter end thereof, said plurality of detent balls being disposed within and movable between said conical opening and said cylindrical opening in surrounding relationship to said rod, said balls being adapted to be at least partially disposed within said recess means when said balls are disposed within said conical opening; and a bearing sleeve stationarily positioned relative to said housing means and slidably supporting said rod, said bearing sleeve having a portion thereof slidably received within said cylindrical opening, and said bearing sleeve further having an axial end surface in bearing engagement with said detent balls for maintaining said balls within said detent sleeve.

* * * * *